Figure 1:
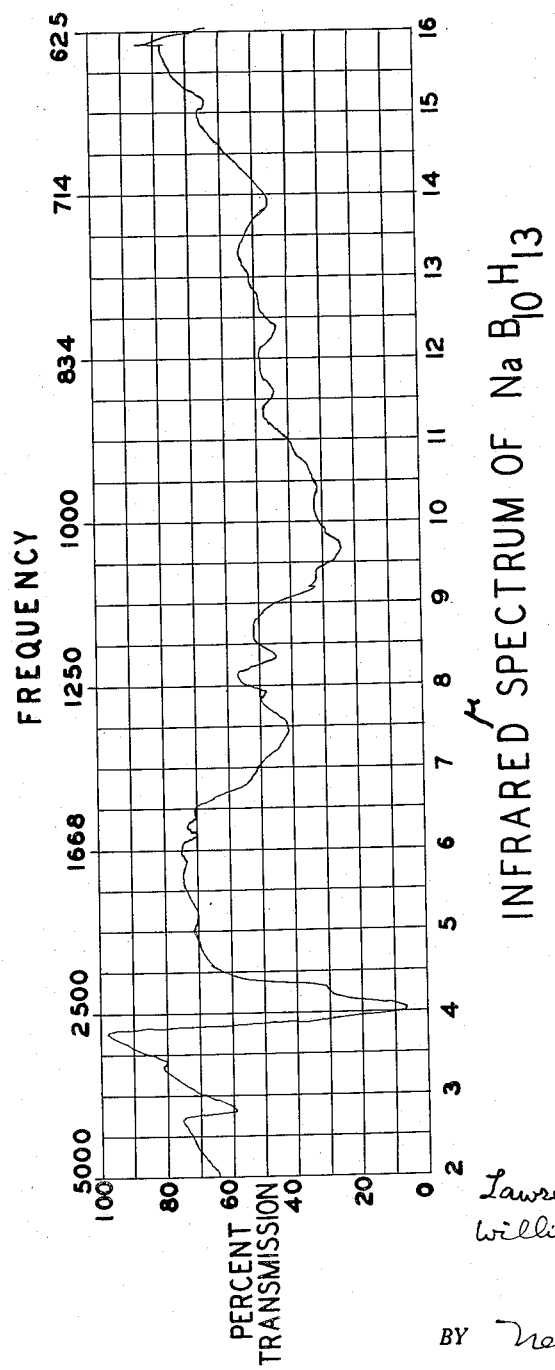
Figure 2:
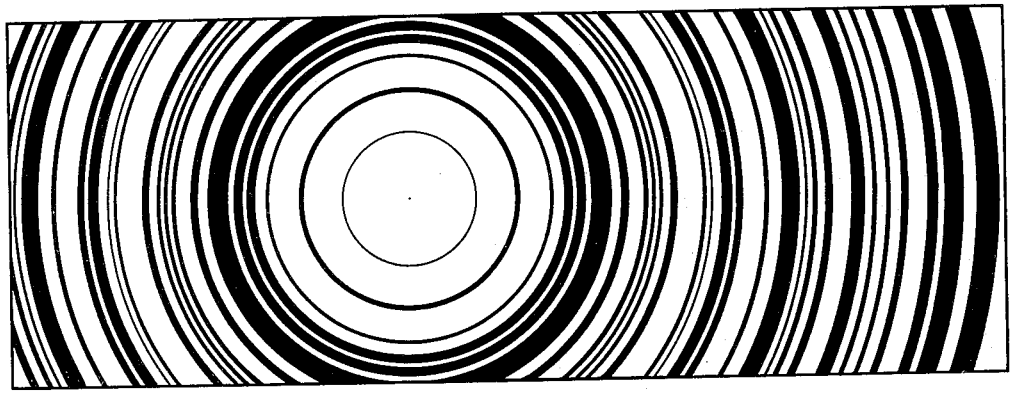

X-RAY DIFFRACTION PATTERN OF $NaB_{10}H_{13}$

United States Patent Office 2,993,751
Patented July 25, 1961

2,993,751
PREPARATION OF ALKALI METAL DERIVATIVES OF DECABORANE
Lawrence J. Edwards, Zelienople, and William V. Hough, Butler, Pa., assignors to Callery Chemical Company, Pittsburgh, Pa., a corporation of Pennsylvania
Filed Mar. 12, 1956, Ser. No. 571,038
13 Claims. (Cl. 23—14)

This invention relates to new compositions of matter referred to as alkali metal derivatives of decaborane having the general formula $MB_{10}H_{13}$ where M is an alkali metal such as sodium, postassium or lithium. It also relates to methods for preparing these new compositions of matter and more particularly to a method of preparing the sodium derivative of decaborane having the formula $NaB_{10}H_{13}$.

The only metal borane salts of the boron hydrides which have been reported in the literature were prepared in 1935 and 1936 by Stock and his co-workers. These included the potassium and sodium salts of diborane, tetraborane, and pentaborane-9. The calcium salt of diborane was also prepared. Since the alkyl derivatives of decaborane have been found to be ideally suited for use as high energy fuels, considerable interest has been aroused in the alkali metal derivatives of decaborane having the general formula $MB_{10}H_{13}$ as possible intermediates in the preparation of mono-alkyl derivatives of decaborane. We have finally succeeded in preparing these hitherto unkown alkali metal derivatives of decaborane.

It is one object of this invention to provide new compositions of matter referred to herein as alkali metal derivatives of decaborane having the general formula $MB_{10}H_{13}$ where M is the alkali metal.

A second object is to provide methods of preparing these new alkali metal derivatives of decaborane by the reaction of a basic alkali metal compound with decaborane in an inert organic solvent.

A third object is to provide a method of preparing $NaB_{10}H_{13}$ by the reaction of sodium hydride, sodium borohydride, sodium trimethoxyborohydride, sodium hydroxide or sodium methoxide with decaborane in an inert solvent consisting of a simple lower alkyl ether, a polyethylene glycol dialkyl ether or hexane.

Other objects will appear from time to time throughout the following description and appended claims.

These new compositions of matter and methods for preparing them will be more fully disclosed hereinafter and the novelty thereof will be particularly pointed out and distinctly claimed.

In the accompanying drawings, there are shown the X-ray pattern and infra-red spectrum for the new compound $NaB_{10}H_{13}$.

This invention is based upon the discovery that when a basic alkali metal compound such as NaH, $$NaHB(OCH_3)_3$$

$NaBH_3$, $NaOH$ or $NaOCH_3$ is reacted with decaborane in an inert organic solvent such as diethyl ether at room temperature, one and only one hydrogen of the decaborane molecule is substituted by the alkali metal to form an alkali metal derivative of decaborane as shown by the following examples:

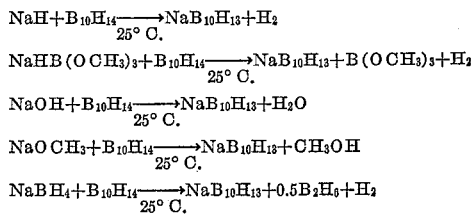

Since $B_{10}H_{14}$ is a protonic acid (normal acid-base titrations with NaOH have been observed) the alkali metal salt of any acid weaker than decaborane will react in a similar manner. Similar reactions take place when the corresponding potassium and lithium compounds are reacted with decaborane. The pressure at which this reaction takes place is not critical. In some cases it is desirable to carry this reaction out under vacuum to facilitate removal and measurement of the hydrogen evolved. The existence of these new alkali metal derivatives of decaborane has been firmly established as shown by the accompanying X-ray pattern and infra-red spectrum of $NaB_{10}H_{13}$.

In one experiment, 255.7 mg. of sodium hydride of 97% purity, 1910 mg. of decaborane and 3 ml. of diethyl ether were placed in a sealed 150 ml. Pyrex tube at room temperature. The mixture was agitated in a wrist-action shaker. Evidence of a reaction was visible within 10 minutes by the disappearance of the solid sodium hydride and a color change of the solution from colorless to amber. When the tube was opened, 10.24 millimols of hydrogen were evolved as measured in a Toepler system. The ether was removed by vacuum condensation leaving a pale yellow solid residue. From this solid was sublimed under vacuum 597 mg. of unreacted decaborane. The results confirmed the calculated stoichiometry of one mol of NaH reacting with one mol of $B_{10}H_{14}$ to yield one mol of hydrogen. The product obtained was a powdered crystalline solid having an elemental analysis corresponding to the empirical formula $NaB_{10}H_{13}$. This compound is soluble in simple ethers, polyethylene glycol dialkyl ethers and water. The yield of $NaB_{10}H_{13}$ was quantitative. Further evidence that this empirical formula was correct was obtained by the reaction of this product with dry HCl in ether from which decaborane and sodium chloride were recovered quantitatively. The infra-red spectrum of $NaB_{10}H_{13}$ differed from that of decaborane in that the tentatively assigned B—H—B bridge frequency characteristic of $B_{10}H_{14}$ was not present. Furthermore, the unique X-ray pattern of $NaB_{10}H_{13}$ shows that it is a new composition of matter.

In another series of experiments, sodium hydride and decaborane were reacted in diethyl ether and the stoichiometry of the reaction was firmly established to be one mol of hydride to one mol of decaborane which yields one mol of hydrogen and one mol of $NaB_{10}H_{13}$ as shown in the table below:

| Run No. | mmols NaH charged | mmols $B_{10}H_{14}$ charged | mls. $(C_2H_5)_2O$ used | Time, hrs. | Temp., °C. | mmols $B_{10}H_{14}$ recovered | mmols $H_2$ Recovered |
|---|---|---|---|---|---|---|---|
| 1 | 5.54 | 5.96 | 4 | 17 | 25 | 0.42 | 5.49 |
| 2 | 10.32 | 15.62 | 4 | 25 | 25 | 4.88 | 10.24 |
| 3 | 10.64 | 3.86 | 4 | 21 | 25 | ---- | 4.02 |

It is apparent from the data obtained that one and only one hydrogen of the decaborane molecule is replaced by sodium in this reaction regardless of whether an equimolar amount of the starting reactants is used or whether an excess of either sodium hydride or decaborane is used. The amount of hydrogen evolved corresponds in every case within experimental error to the amount of the starting reactant not used in excess. A quantitative yield of $NaB_{10}H_{13}$ is readily obtained.

Similar reactions were carried out with sodium hydroxide and sodium, methoxide respectively with decaborane in either solution. When the hydroxide was used, water was formed which was removed from the $NaB_{10}H_{13}$ by evacuation. When the methoxide was used, methanol was formed which was readily removed from the $NaB_{10}H_{13}$ by similar vacuum techniques. In each case, the X-ray pattern and infra-red spectrum for the product corresponded to the product obtained by the reaction of sodium hydroxide with decaborane. It was also found that the hydroxides, methoxides and hydrides of potassium and lithium could be substituted for the corresponding sodium compounds with equally effective results to yield $LiB_{10}H_{13}$ and $KB_{10}H_{13}$. Inert solvents such as hexane and the polyethylene glycol dialkyl ethers may also be used for these reactions if desired.

In another series of experiments, lithium borohydride which is ether soluble, was reacted with decaborane in diethyl ether solution at room temperature in a sealed pyrex glass tube with continuous agitation. The results obtained are shown below:

| Run No. | mmols $LiBH_4$ Charged | mmols $B_{10}H_{14}$ Charged | mmols $(C_2H_5)_2O$ Charged | mmols $H_2$ Recovered | mmols $B_2H_6$ Recovered | mmols $(C_2H_5)_2O$ Recovered |
|---|---|---|---|---|---|---|
| 1 | 2.80 | 5.61 | 20.7 | 3.08 | 1.42 | 17.7 |
| 2 | 3.65 | 6.69 | 22.8 | 3.72 | 1.75 | 19.1 |

These results show that one mol of $LiBH_4$ reacted with one mol of $B_{10}H_{14}$ to evolve one mol of $H_2$, one-half mol of $B_2H_6$ and that one mol of dietyl ether was absorbed. Thus, the reaction which occurred can be illustrated as follows:

$$LiBH_4 + B_{10}H_{14} \xrightarrow{(C_2H_5)_2O} LiB_{10}H_{13}\cdot(C_2H_5)_2O + 0.5 B_2H_6 + H_2$$

When the $LiB_{10}H_{13}$ etherate was heated at 50–100° C., all of the ether was evolved leaving solid $LiB_{10}H_{13}$.

The alkali metal derivatives of decaborane having the general formula $MB_{10}H_{13}$, where M is the alkali metal, give distinctive X-ray patterns and infrared spectra which differentiate them from decaborane and establish that they are decaborane derivatives. These derivatives can be converted to a different compound having the general empirical formula $MB_{10}H_{14}$, where M is the alkali metal, by treatment of an ether solution containing one of these compounds with hydrogen at 50° C. and 800 p.s.i.g. pressure. A mild partial hydrolysis of $MB_{10}H_{13}$ with water results in the evolution of two mols of hydrogen per mol of derivative whereas a similar hydrolysis of $MB_{10}H_{14}$ results in the evolution of 2.5 mols of hydrogen per mol of derivative.

These new decaborane derivatives with the general formula $MB_{10}H_{13}$ are useful as reducing agents—e.g., reaction with dimethyl sulfate will produce sulfur dioxide and reaction with organic compounds will result in the reduction of functional groups which are reducible by decaborane. They also provide a water soluble form of decaborane since decaborane itself is insoluble in water. These compounds are highly toxic in aqueous solution when taken internally and are useful as insecticides and rodenticides—e.g., an aqueous solution of $NaB_{10}H_{13}$ when applied to an anthill results in rapid destruction of the ants. The toxicity hazard of decaborane can be reduced by converting it to the non-volatile $NaB_{10}H_{13}$ or one of the other alkali metal derivatives herein described for ease of transportation and storage. These derivatives are stable and decaborane can be readily regenerated by acidification in non-aqueous solution. These metal derivatives are also potentially useful as intermediates in the preparation of other decaborane derivatives such as alkyl decaboranes.

Having thus described these new compositions of matter and methods for preparing them, it should be understood that other variations will become apparent to those skilled in the art and that within the scope of the appended claims, this invention may be practiced otherwise than as specifically described.

What we claim as our invention is:

1. As a new composition of matter, an alkali metal derivative of decaborane having the general formula $MB_{10}H_{13}$ where M is an alkali metal selected from the class consisting of sodium, potassium and lithium.

2. As a new composition of matter, the sodium derivative of decaborane having the empirical formula $NaB_{10}H_{13}$.

3. As a new composition of matter, the lithium derivative of decaborane having the empirical formula $LiB_{10}H_{13}$.

4. A method of preparing alkali metal derivatives of decaborane having the general formula $MB_{10}H_{13}$ where M is an alkali metal which comprises reacting a strongly basic alkali metal compound with decaborane in a solvent which is inert to the reactants and reaction product at room temperature and atmospheric pressure and recovering the $MB_{10}H_{13}$ formed.

5. A method of preparing alkali metal derivatives of decaborane having the general formula $MB_{10}H_{13}$ which comprises reacting a strongly basic alkali metal compound selected from the group consisting of hydrides, borohydrides, lower alkoxy substituted borohydrides, hydroxides, and lower alcoholates of sodium, potassium and lithium with decaborane in a solvent which is inert to the reactants and reaction product at room temperature and atmospheric pressure and recovering the $MB_{10}H_{13}$ formed, where M is the alkali metal used.

6. A method according to claim 4 in which the solvent is selected from the class consisting of the lower alkyl simple ethers, polyethylene glycol dialkyl ethers and hexane.

7. A method according to claim 6 in which sodium hydride is reacted with decaborane and the reaction product recovered is $NaB_{10}H_{13}$.

8. A method according to claim 6 in which lithium borohydride is reacted with decaborane and the reaction product recovered is $LiB_{10}H_{13}$.

9. A method according to claim 6 in which the alkali metal compound and decaborane are reacted in a molar ratio of 1:1.

10. A method of preparing the sodium derivative of decaborane having the empirical formula $NaB_{10}H_{13}$ which comprises reacting equimolar quantities of sodium hydried and decaborane in diethyl ether at room temperature and atmospheric pressure and recovering the $NaB_{10}H_{13}$ formed.

11. A method of preparing the compound $NaB_{10}H_{13}$ which comprises reacting equimolar quantities of sodium hydroxide and decaborane in hexane at room temperature and atmospheric pressure and recovering the $NaB_{10}H_{13}$ formed.

12. A method of preparing the compound $NaB_{10}H_{13}$ which comprises reacting equimolar quantities of sodium methoxide and decaborane in hexane at room temperature and atmospheric pressure and recovering the NaB$_{10}$H$_{13}$ formed.

13. A method of preparing the compound LiB$_{10}$H$_{13}$ which comprises reacting equimolar quantities of lithium borohydride and decaborane in diethyl ether at room temperature and atmospheric pressure to form $$\text{LiB}_{10}\text{H}_{13} \cdot (\text{C}_2\text{H}_5)_2\text{O}$$

heating said etherate at 50–100° C. to remove the ether and recovering the solid LiB$_{10}$H$_{13}$ formed.

References Cited in the file of this patent

Schlesinger et al.: J.A.C.S., vol. 75, page 187 (1953).
Stock: "Hydrides of Boron and Silicon," pages 85, 138–140 (1933), Cornell University Press, Ithaca, N.Y.
Stock et al.: "Z. Anorg. Allgem. Chem." vol. 228, pp. 178–192 (1936).
Sidgwick: "Chemical Elements and Their Compounds," vol. 1, pages 346–349 (1950), Oxford Univ. Press, London.